United States Patent
Salehi et al.

(10) Patent No.: US 11,801,870 B2
(45) Date of Patent: Oct. 31, 2023

(54) SYSTEM FOR GUIDING AN AUTONOMOUS VEHICLE BY A TOWING TAXI

(71) Applicant: GM Global Technology Operations LLC, Detroit, MI (US)

(72) Inventors: Rasoul Salehi, Ann Arbor, MI (US); Yao Hu, Sterling Heights, MI (US); Arun Adiththan, Sterling Heights, MI (US); Yilu Zhang, Northville, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 284 days.

(21) Appl. No.: 17/471,323

(22) Filed: Sep. 10, 2021

(65) Prior Publication Data

US 2023/0082897 A1 Mar. 16, 2023

(51) Int. Cl.
*B60W 60/00* (2020.01)
*G07C 5/08* (2006.01)
(Continued)

(52) U.S. Cl.
CPC ........ *B60W 60/0025* (2020.02); *B60W 10/04* (2013.01); *B60W 10/18* (2013.01);
(Continued)

(58) Field of Classification Search
CPC ...... B60W 10/04; B60W 10/18; B60W 10/20; B60W 10/22; B60W 2420/42; B60W 2420/52; B60W 2520/06; B60W 2520/10; B60W 2520/12; B60W 2540/10; B60W 2540/12; B60W 2540/18; B60W 2556/60; B60W 2556/65; B60W 2710/18;
(Continued)

(56) References Cited

U.S. PATENT DOCUMENTS

| | | | | |
|---|---|---|---|---|
| 8,874,305 B2 * | 10/2014 | Dolgov | ..................... | B60T 7/22 701/28 |
| 10,579,070 B1 * | 3/2020 | Konrardy | ............... | G08G 1/161 |

(Continued)

FOREIGN PATENT DOCUMENTS

DE 102021204225 A1 * 11/2022
WO WO-2020028893 A1 * 2/2020 ............... B60D 1/36

*Primary Examiner* — Babar Sarwar
(74) *Attorney, Agent, or Firm* — Vivacqua Crane, PLLC (57) ABSTRACT

An autonomous driving system for an autonomous vehicle includes an automated driving controller wirelessly connected to a towing taxi. The automated driving controller determines the autonomous driving system is non-functional. In response to determining the autonomous driving system is non-functional, the automated driving controller generates a notification indicating the autonomous driving system is non-functional. The automated driving controller receives, from the towing taxi, a current data string including a data point corresponding to a current point in time in combination with a predicted data point for each of one or more predicted points of time in the future. The current data string is compared with a previous data string recorded at a previous point in time. In response to determining the current data string matches the previous data string, the automated driving controller determines one or more driving maneuvers for the autonomous vehicle based on the current data string.

20 Claims, 6 Drawing Sheets

(51) Int. Cl.
| | |
|---|---|
| *B60W 50/00* | (2006.01) |
| *B60W 10/18* | (2012.01) |
| *B60W 10/20* | (2006.01) |
| *B60W 10/04* | (2006.01) |
| *B60W 10/22* | (2006.01) |
| *H04W 4/46* | (2018.01) |
| *B60W 50/035* | (2012.01) |

(52) U.S. Cl.
CPC ............ *B60W 10/20* (2013.01); *B60W 10/22* (2013.01); *B60W 50/0097* (2013.01); *B60W 50/035* (2013.01); *G07C 5/0816* (2013.01); *H04W 4/46* (2018.02); *B60W 2420/42* (2013.01); *B60W 2420/52* (2013.01); *B60W 2520/06* (2013.01); *B60W 2520/10* (2013.01); *B60W 2520/12* (2013.01); *B60W 2540/10* (2013.01); *B60W 2540/12* (2013.01); *B60W 2540/18* (2013.01); *B60W 2556/60* (2020.02); *B60W 2556/65* (2020.02); *B60W 2710/18* (2013.01); *B60W 2710/20* (2013.01); *B60W 2710/22* (2013.01)

(58) Field of Classification Search
CPC ......... B60W 2710/20; B60W 2710/22; B60W 50/0097; B60W 50/035; B60W 60/0025; G07C 5/0816; H04W 4/46
See application file for complete search history.

(56) References Cited

U.S. PATENT DOCUMENTS

| | | | |
|---|---|---|---|
| 11,151,883 | B2* | 10/2021 | Kline .................... G05D 1/0088 |
| 11,209,824 | B1* | 12/2021 | Kingman ............ B60W 30/095 |
| 2018/0186377 | A1* | 7/2018 | Bramson ................. B60L 50/61 |
| 2019/0080612 | A1* | 3/2019 | Weissman ............... G01S 19/42 |
| 2019/0210418 | A1* | 7/2019 | Hall ....................... B60D 1/245 |
| 2020/0173795 | A1* | 6/2020 | Hardee .............. G01C 21/3415 |
| 2021/0109535 | A1* | 4/2021 | Tansey .................. B60W 30/09 |
| 2021/0197702 | A1* | 7/2021 | Krishnamurthi ..... G05D 1/0295 |
| 2022/0051156 | A1* | 2/2022 | Kumar ................... G07C 5/006 |
| 2022/0236729 | A1* | 7/2022 | Wang ................. B60W 50/029 |

* cited by examiner

SYSTEM FOR GUIDING AN AUTONOMOUS VEHICLE BY A TOWING TAXI

INTRODUCTION

The present disclosure relates to an autonomous vehicle guided by a towing taxi. More particularly, the present disclosure relates to an autonomous vehicle that is guided by a towing taxi in the event an autonomous driving system is non-functional.

An autonomous vehicle may drive from a starting point to a predetermined destination with limited or no human intervention using various in-vehicle technologies and sensors. Autonomous vehicles include a variety of autonomous sensors such as, but not limited to, cameras, sonic sensors, radar, LiDAR, global positioning systems (GPS), and inertial measurement units (IMU) for detecting a vehicle's exterior surroundings and status. An onboard controller of the vehicle determines an appropriate driving route based on a destination entered by a user in combination with the information gathered by the various autonomous sensors.

Sometimes issues may arise in either the vehicle's hardware or software that cause to autonomous system to become non-functional and no longer be able to drive the vehicle to the destination indicated by the vehicle's user. For example, a hardware fault may occur when one of the vehicle's sensors such as LiDAR experiences damage. Alternatively, a software fault such as, for example, a fault in the planning algorithm may cause the onboard controller to no longer be able to guide the vehicle to the destination. It is to be appreciated that although the autonomous system is non-functional, other vehicle components such as the propulsion or chassis systems of the autonomous vehicle may still function. In other words, the motor and drivetrain components that propel the autonomous vehicle still function, however, the systems governing autonomous operation are unable to guide the vehicle. Although the propulsion components are functional, the autonomous vehicle is no longer able to travel to the destination entered by the vehicle's user.

Thus, while current autonomous vehicles achieve their intended purpose, there is a need in the art for an improved system that allows an autonomous vehicle to continue to drive even when there is an issue with one or more autonomous sensors or the autonomous vehicle algorithms.

SUMMARY

According to several aspects, an autonomous driving system for an autonomous vehicle is disclosed. The autonomous driving system includes an automated driving controller wirelessly connected to a towing taxi that guides the autonomous vehicle when the autonomous driving system is non-functional. The automated driving controller is instructed to determine the autonomous driving system is non-functional. In response to determining the autonomous driving system is non-functional, the automated driving controller generates a notification indicating the autonomous driving system is non-functional, where the notification results in the towing taxi being dispatched to a geographical location of the autonomous vehicle. The automated driving controller receives, from the towing taxi, a current data string including a data point corresponding to a current point in time in combination with a predicted data point for each of one or more predicted points of time in the future. The automated driving controller compares the current data string with a previous data string recorded at a previous point in time that occurred immediately before the current point in time. Finally, in response to determining the current data string matches the previous data string, the automated driving controller determines one or more driving maneuvers for the autonomous vehicle based on the current data string.

In another aspect, the data point corresponding to the current point in time and the predicted data point for each of one or more predicted points of time in the future is represented by a final command determined by the towing taxi.

In yet another aspect, the final command represents driver input positions of the autonomous vehicle.

In still another aspect, the driver input positions include an accelerator pedal position, a brake pedal position, and a steering wheel angle position.

In another aspect, the final command represents a reference trajectory set point for the autonomous vehicle.

In yet another aspect, the reference trajectory set point includes a speed trajectory point or a heading angle trajectory point for the autonomous vehicle.

In still another aspect, the final command represents a target goal for the autonomous vehicle.

In one aspect, the data point corresponding to the current point in time and the predicted data point for each of one or more predicted points of time in the future is represented by perception data determined by the towing taxi.

In another aspect, the automated driving controller executes instructions to transmit, to the towing taxi, driving limitations and a request defining a type of data required, wherein the towing taxi transmits the perception data in response to receiving the driving limitations and the request defining the type of data.

In yet another aspect, the automated driving controller is in wireless communication with a back office system including a back office facility.

In still another aspect, the notification indicating the autonomous driving system is non-functional is transmitted to the back office facility of the back office system.

In another aspect, the autonomous vehicle includes a plurality of on-board autonomous sensors in electronic communication with the automated driving controller.

In yet another aspect, at least one of the automated driving controller and the plurality of on-board autonomous sensors experience a fault that causes the autonomous driving system to become non-functional.

In still another aspect, the plurality of on-board autonomous sensors include at least one of the following: one or more cameras, one or more radars, an inertial measurement unit (IMU), a global positioning system (GPS), and one or more LiDARs.

In another aspect, the automated driving controller executes instructions to repeatedly receives a predicted receding horizon set of data from the towing taxi, where the predicted receding horizon set of data includes at least one of the following: predictions of future commands and perception data.

In yet another aspect, the automated driving controller executes instructions to determine a data drop between the automated driving controller and the towing taxi has occurred and in response determines one or more driving maneuvers based on the data included in the previous data string.

In still another aspect, the data drop occurs when a specific data string for the current point in time is missed and is not transmitted to the automated driving controller from the towing taxi.

In one aspect, an autonomous driving system for an autonomous vehicle. The autonomous driving system includes a plurality of on-board autonomous sensors that sense data related to operation of the autonomous vehicle and a surrounding environment. The autonomous driving system further includes an automated driving controller in electronic communication with the plurality of on-board autonomous sensors and wirelessly connected to a towing taxi that guides the autonomous vehicle when the autonomous driving system is non-functional. The automated driving controller is instructed to determine the autonomous driving system is non-functional. In response to determining the autonomous driving system is non-functional, the automated driving controller generates a notification indicating the autonomous driving system is non-functional, where the notification results in the towing taxi being dispatched to a geographical location where the autonomous vehicle is located. The automated driving controller sends a request for raw sensor data to the towing taxi and compares the raw sensor data received from the towing taxi with data collected from the plurality of on-board autonomous sensors that are still functional. The automated driving controller determines the raw sensor data received from the towing taxi matches the data collected from the plurality of on-board autonomous sensors that are still functional. In response to determining the raw sensor data received from the towing taxi matches the data collected from the plurality of on-board autonomous sensors that are still functional match, the automated driving controller determines one or more driving maneuvers based on the raw sensor data received from the towing taxi.

In one aspect, the raw sensor data received from the towing taxi includes one or more of the following: image data, signals from a radar, data from an IMU, GPS coordinates, and signals from a LiDAR.

In another aspect, a non-transitory computer readable storage medium readable by a processing circuit and storing instructions that when executed by the processing circuit perform method operations is disclosed. The method includes determining an autonomous driving system is non-functional, where the autonomous driving system is for an autonomous vehicle. In response to determining the autonomous driving system is non-functional, the method includes generating a notification indicating the autonomous driving system is non-functional. The notification results in a towing taxi being dispatched to a geographical location of the autonomous vehicle. The method further includes receiving, from the towing taxi, a current data string including a data point corresponding to a current point in time in combination with a predicted data point for each of one or more predicted points of time in the future. The method further includes comparing the current data string with a previous data string recorded at a previous point in time that occurred immediately before the current point in time. Finally, in response to determining the current data string matches the previous data string, the method includes determining one or more driving maneuvers for the autonomous vehicle based on the current data string.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
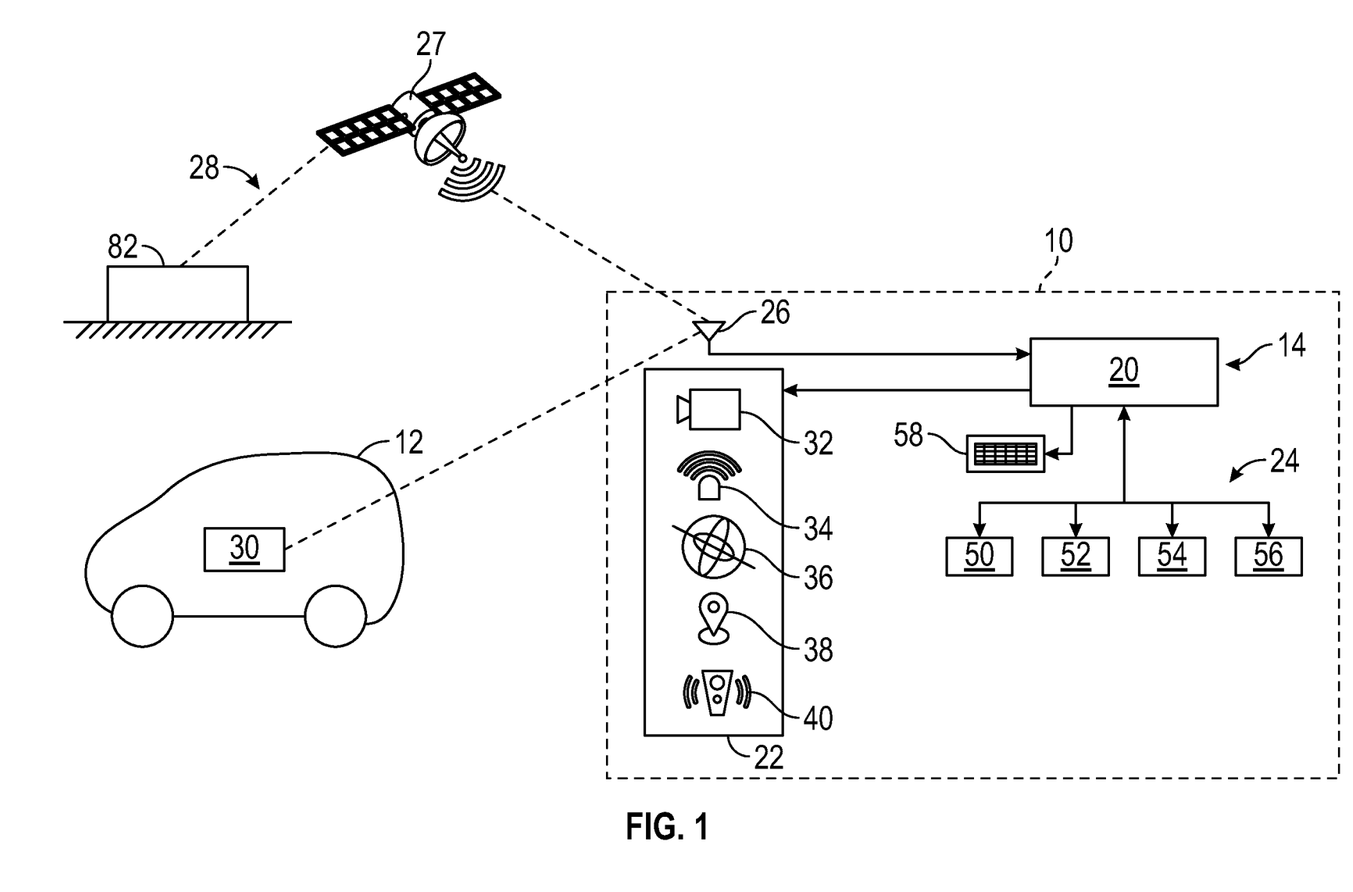
FIG. 1 is a schematic diagram of an autonomous vehicle including an automated driving controller in wireless communication with a towing taxi and a back office system, according to an exemplary embodiment.

Referring to FIG. 1, an exemplary autonomous vehicle 10 in wireless communication with a towing taxi 12 is illustrated. The autonomous vehicle 10 may be any type of vehicle such as, but not limited to, a sedan, truck, sport utility vehicle, van, or motor home. In one non-limiting embodiment, the autonomous vehicle 10 is a fully autonomous vehicle including an automated driving system (ADS) for performing all driving tasks. Alternatively, in another embodiment, the autonomous vehicle 10 is a semi-autonomous vehicle including an advanced driver assistance system (ADAS) for assisting a driver with steering, braking, and/or accelerating. The autonomous vehicle 10 has an autonomous driving system 14 that includes an automated driving controller 20. The autonomous driving system 14 also includes a plurality of on-board autonomous sensors 22, a plurality of vehicle systems 24, and an antenna 26 that are all in electronic communication with the automated driving controller 20. The antenna 26 wirelessly connects the automated driving controller 20 to a satellite 27 that is part of a back office system 28 as well as a guidance system 30 that is part of the towing taxi 12.

As explained below, the towing taxi 12 guides the autonomous vehicle 10 in the event the automated driving controller 20 is unable to function. Specifically, the towing taxi 12 provides guidance in the event either the automated driving controller 20 or one of the on-board autonomous sensors 22 experience a fault that causes the autonomous driving system 14 to become non-functional. When non-functional, the autonomous driving system 14 is unable to drive the autonomous vehicle 10 to a predetermined location. As also explained below, the towing taxi 12 may employ either a centralized approach or a projection approach to guide the autonomous vehicle 10. Specifically, the centralized approach to guiding the autonomous vehicle 10 includes transmitting final commands to the automated driving controller 20. In contrast, the projection based approach includes transmitting either raw sensor data or perception data to the automated driving controller 20. The automated driving controller 20 then determines the final commands based on either the raw sensor data or the perception data received from the towing taxi 12.

The automated driving controller 20 determines autonomous driving features such as perception, planning, localization, mapping, and control of the autonomous vehicle 10. Although FIG. 1 illustrates the automated driving controller 20 as a single controller, it is to be appreciated that multiple controllers may be included as well. The plurality of on-board autonomous sensors 22 sense data related to the operation of the autonomous vehicle 10 and a surrounding environment, which is sent to the automated driving controller 20. The plurality of on-board autonomous sensors 22 include one or more cameras 32, a radar 34, an inertial measurement unit (IMU) 36, a global positioning system (GPS) 38, and LiDAR 40, however, it is to be appreciated that additional sensors may be used as well.

The plurality of vehicle systems 24 include, but are not limited to, a brake system 50, a steering system 52, a powertrain system 54, and a suspension system 56. The automated driving controller 20 sends vehicle control commands to the plurality of vehicle systems 24, thereby guiding the autonomous vehicle 10 to the predetermined destination. For example, a user of the autonomous vehicle 10 may enter the predetermined destination using an input device 58 that is in electronic communication with the automated driving controller 20. In one embodiment, the input device 58 may be a keyboard.

Figure 2:
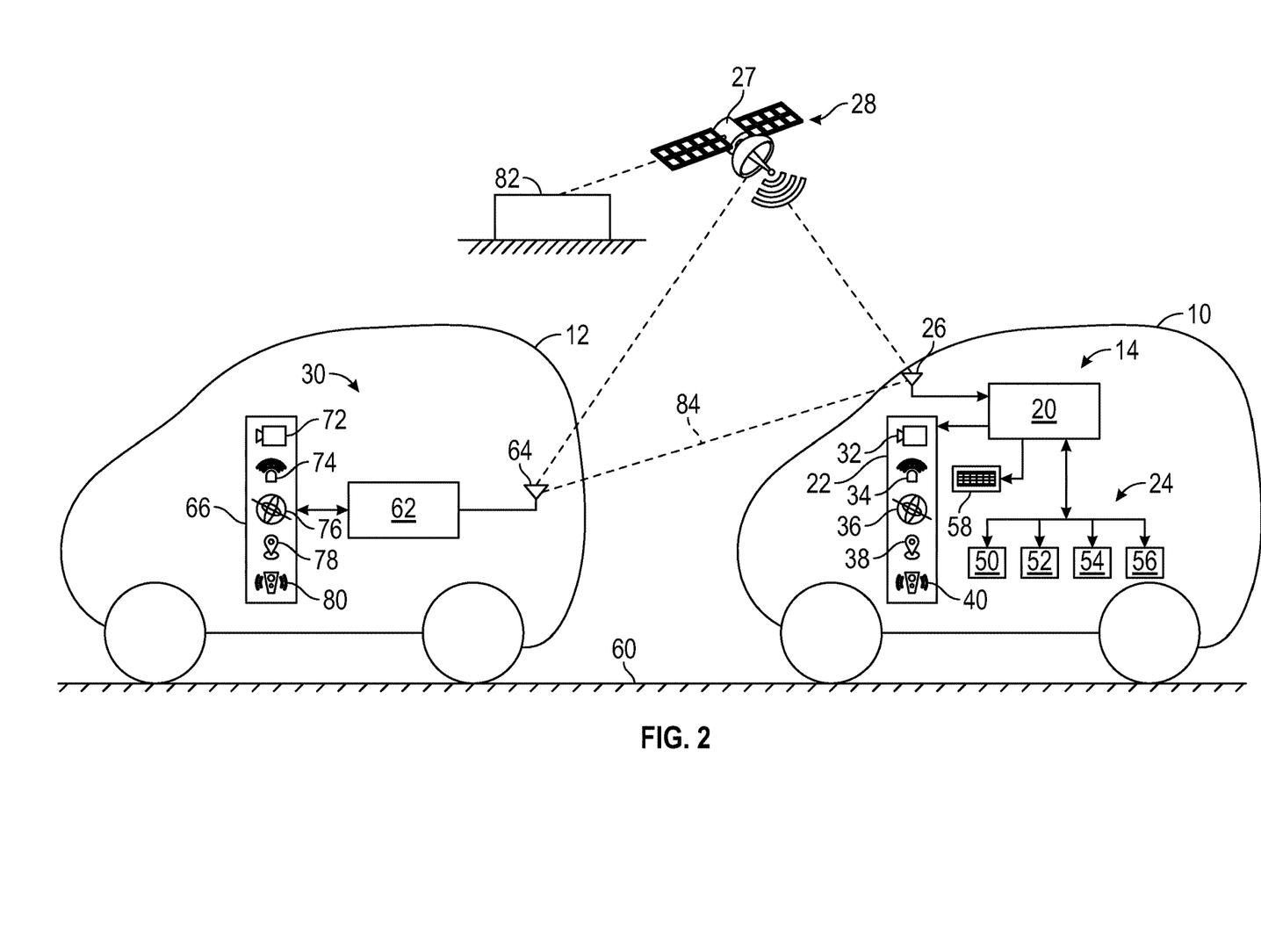
FIG. 2 is a schematic diagram of the towing taxi shown in FIG. 1 positioned relative to the autonomous vehicle, according to an exemplary embodiment.

In the example as shown in FIG. 1, the towing taxi 12 is an automobile. However, it is to be appreciated that FIG. 1 is merely exemplary in nature, and the towing taxi 12 is any type of land-based or air-based vehicle such as, but not limited to, a truck, a van, or an unmanned aerial vehicle (UAV). Referring now to FIG. 2, the autonomous vehicle 10 is positioned along a roadway 60. The towing taxi 12 is positioned in front of the autonomous vehicle 10 along the roadway 60. The towing taxi 12 may be positioned either along the roadway 60 if the towing taxi 12 is a land-based vehicle or, in the alternative, above the roadway 60 if the towing taxi 12 is an air-based vehicle.

As seen in FIG. 2, the guidance system 30 of the towing taxi 12 includes a towing controller 62 in electronic communication with an antenna 64 and a plurality autonomous sensors 66 that sense data related to operation of the towing taxi 12 and the surrounding environment. The antenna 64 wirelessly connects the towing controller 62 of the towing taxi 12 to the satellite 27 of the back office system 28 as well as the automated driving controller 20 of the autonomous vehicle 10. The plurality of autonomous sensors 66 include, for example, one or more cameras 72, a radar 74, an IMU 76, a GPS 78, and LiDAR 80, however, it is to be appreciated that additional sensors may be used as well. As explained below, the data collected by the plurality autonomous sensors 66 is processed by the towing controller 62 and sent to the automated driving controller 20 of the autonomous vehicle 10 as either final commands. In the alternative, the data collected by the plurality of autonomous sensors 66 is transmitted to the automated driving controller 20 as raw sensor data or perception data.

Continuing to refer to FIG. 2, the back office system 28 includes the satellite 27 and a back office facility 82. The back office facility 82 may be, for example, a data center that is staffed by on-site personnel. The back office facility 82 receives a notification via the satellite 27 from the automated driving controller 20 of the autonomous vehicle 10 indicating the autonomous driving system 14 is unable to guide the autonomous vehicle 10. The notification generated by the automated driving controller 20 includes information such as, but not limited to, original trip information, fault codes, passenger information, available autonomous sensor data, and vehicle limits. Some examples of passenger information include number of passengers, their individual destinations, preferences such as the time of arrival, and road type (such as highway or toll roads). One example of the vehicle limits includes speed. The autonomous driving system 14 may be unable to guide the autonomous vehicle 10 in the event one or more of the on-board autonomous sensors 22 of the autonomous vehicle 10 are non-functional and/or if the automated driving controller 20 experiences a software fault that causes the autonomous driving system 14 to no longer be able to guide the autonomous vehicle 10 to the destination indicated by the vehicle's passenger.

In response to receiving the notification from the automated driving controller 20, the back office facility 82 dispatches the towing taxi 12 to a geographical location where the autonomous vehicle 10 is located. The back office facility 82 also sends messages including information regarding the towing taxi 12 to the automated driving controller 20. The messages include information such as, but not limited to, towing taxi specifications, a specific towing mechanism (i.e., aerial or ground-based), and an updated destination. For example, the updated destination may be a repair facility. The back office facility 82 also sends messages such as security codes to establish a communication link 84 between the automated driving controller 20 of the autonomous vehicle 10 and the towing controller 62.

Figure 3:
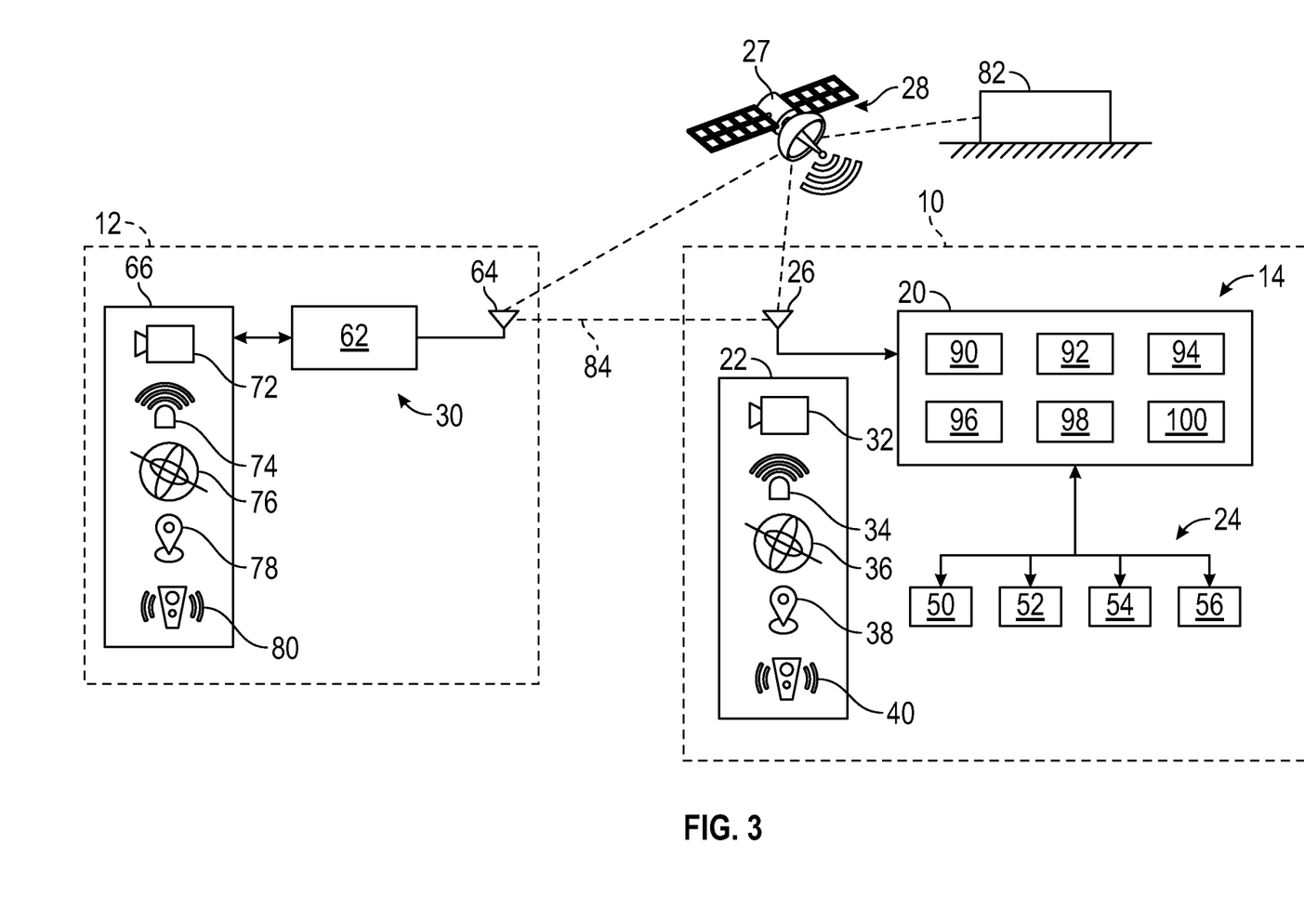
FIG. 3 is a schematic diagram illustrating a towing controller in electronic communication with the automated driving controller of the autonomous vehicle, according to an exemplary embodiment.

FIG. 3 is a schematic diagram illustrating the automated driving controller 20 of the autonomous vehicle 10 in wireless communication with the towing controller 62 of the towing taxi 12 via the communication link 84. As explained below, the towing controller 62 transmits either final commands or, in the alternative, raw sensor data or perception data to the automated driving controller 20 of the autonomous vehicle 10. The automated driving controller 20 sends vehicle control commands to the plurality of vehicle systems 24 that guide the autonomous vehicle 10 along the roadway 60 (seen in FIG. 2) based on either the final commands or the sensor and perception data received from the towing controller 62. The automated driving controller 20 also transmits real-time feedback signals to the towing controller 62 of the towing taxi 12 over the communication link 84. Some examples of information included by the real-time feedback signals include, but are not limited to, available data collected by the plurality of on-board autonomous sensors 22 that are functional, a communication state (i.e., if data received from the towing taxi 12 is received, partially received, or lost), passenger feedback, and biometric information.

In the embodiment as shown in FIG. 3, the automated driving controller 20 includes a vehicle-health monitoring module 90, a notification module 92, a request module 94, a receding horizon monitoring module 96, a verification module 98, and a driving module 100. The vehicle-health monitoring module 90 determines that one or more hardware or software faults have occurred within the autonomous driving system 14, which in turn causes the autonomous driving system 14 to become non-functional. The notification module 92 generates the notification indicating the autonomous driving system 14 is non-functional, which is transmitted to the back office facility 82 via the satellite 27. The notification results in the back office system 28 dispatching the towing taxi 12 to the geographical location where the autonomous vehicle 10 is located. The request module 94 of the automated driving controller 20 sends one or more requests over the communication link 84 to the towing controller 62 of the towing taxi 12 requesting data.

Figure 4:
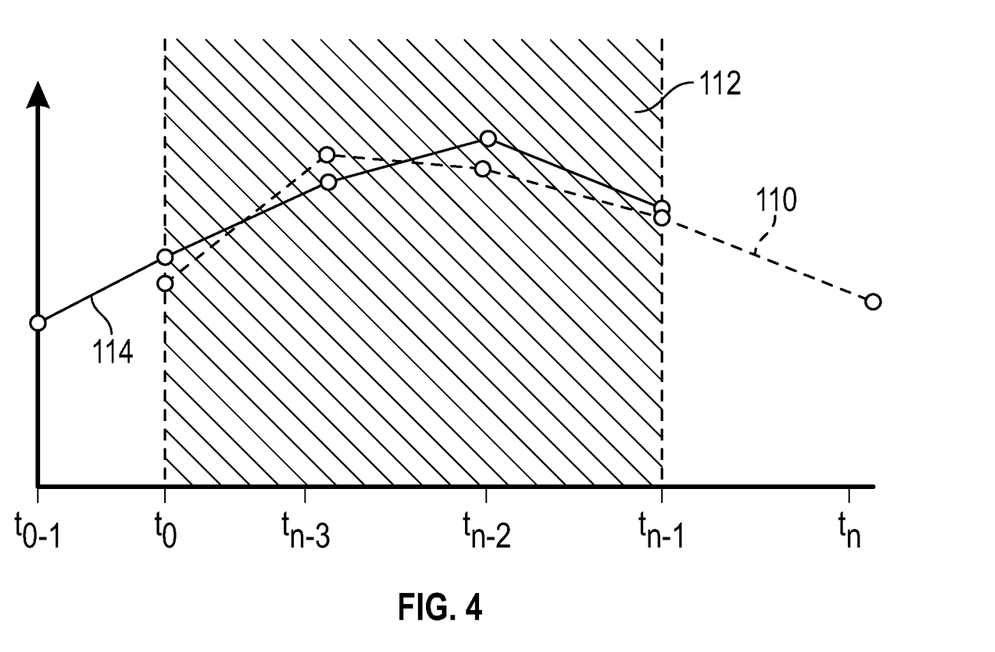
FIG. 4 illustrates a graph including a current data string plotted against a previous data string, according to an exemplary embodiment.

The receding horizon monitoring module 96 of the automated driving controller 20 repeatedly receives a predicted receding horizon set of data from the towing taxi 12. Specifically, the predicted receding horizon set of data includes predictions of future commands or perception data such as dynamic object locations and is determined based on data collected by the plurality autonomous sensors 66 that are part of the towing taxi 12, which is transmitted over the communication link 84. If the towing taxi 12 employs the centralized approach to guide the autonomous vehicle 10, then the towing controller 62 of the towing taxi 12 calculates final commands indicating a final trajectory of the autonomous vehicle 10 based on data collected by the plurality of autonomous sensors 66. Referring to FIGS. 3 and 4, the towing controller 62 calculates a current data string 110, which includes a data point for a current point in time, which is represented as to, as well as a predicted data point for one or more predicted points of time in the future, which is illustrated in FIG. 4 as a shaded area 112 that spans between $t_0$ and $t_{n-1}$. Specifically, as seen in FIG. 4, the one or more predicted points of time in the future are represented as $t_{n-3}$, $t_{n-2}$, and $t_{n-1}$, however, it is to be appreciated that FIG. 4 is merely exemplary in nature, and more than three predicted points of time in the future may be used as well.

Continuing to refer to FIGS. 3 and 4, the receding horizon monitoring module 96 receives as input the current data string 110, which includes a data point corresponding to the current point in time in combination with a predicted data point for each of the one or more predicted points of time in the future. Specifically, when employing the centralized approach to guide the autonomous vehicle 10, the data point corresponds to a final command determined by the towing controller 62 of the towing taxi 12. The receding horizon monitoring module 96 compares the current data string 110 with a previous data string 114, which was recorded at a previous point in time $t_{0-1}$ that occurred immediately before the current point in time to. In response to determining the current data string 110 matches the previous data string 114, the receding horizon monitoring module 96 determines the current data string 110 is valid, and the driving module 100 determines one or more driving maneuvers for the autonomous vehicle 10 based on the current data string 110 as described below. However, if the current data string 110 does not match the previous data string 114, the receding horizon monitoring module 96 determines the current data string 110 is invalid, and the current data string 110 is discarded. However, in embodiments, an exception may occur when the towing taxi 12 notifies the autonomous vehicle 10 there are changes in a data signal compared to a previous point in time, and the autonomous vehicle 10 may accept the new string of data despite an observable deviation.

It is to be appreciated that the receding horizon monitoring module 96 determines the current data string 110 and the previous data string 114 match one another when the data falls within a predetermined margin of error. The predetermined margin of error accounts for differences in the data based on factors such as, but not limited to, sensor error, or relatively minor adaptations to the information used by the towing taxi 12. Furthermore, in some instances, the receding horizon monitoring module 96 may determine a data drop between the automated driving controller 20 and the towing controller 62 of the towing taxi 12 has occurred. A data drop occurs when a specific data string for the current point in time is missed and is not transmitted to the automated driving controller 20. For example, there may be an interruption in the communication link 84 between the autonomous vehicle 10 and the towing taxi 12. In response to determining a data drop has occurred, the automated driving controller 20 determines one or more driving maneuvers based on the data included in the previous data string 114.

Once the current data string 110 is verified, the verification module 98 selects a specific data point of the current data string 110 to use based on a time stamp. The driving module 100 of the automated driving controller 20 then determines one or more driving maneuvers based on the specific data type of the current data string 110. Specifically, if the final commands determined by the towing controller 62 of the towing taxi 12 represent driver input positions of the autonomous vehicle 10. In an embodiment, the driver input positions include an accelerator pedal position, a brake pedal position, and a steering wheel angle position. For example, in one embodiment, the driving module 100 may set positions for an accelerator pedal and a steering wheel of the autonomous vehicle 10 based on the final commands determined by the towing controller 62 of the towing taxi 12.

In another embodiment, the final commands determined by the towing controller 62 of the towing taxi 12 includes reference trajectory set points for the autonomous vehicle 10. In an embodiment, the reference trajectory set points include speed trajectory points and heading angle trajectory points. In yet another embodiment, the final commands indicate target goals for the autonomous vehicle 10 such as, for example, target position, lane, speed, and distance from other vehicles on the road, and the driving module 100 executes a planning algorithm to determine the set points for the autonomous vehicle 10 based on the target goals.

As mentioned above, in another embodiment, the towing controller 62 of the taxi 12 employs a projection based approach instead of the centralized approach. When employing the projection approach, the automated driving controller 20 first transmits driving limitations to the towing controller 62 of the towing taxi 12 over the communication link 84. Some examples of driving limitations include, but are not limited to, speed and acceleration. The automated driving controller 20 also sends a request defining the type of data required. Specifically, the automated driving controller 20 requests either raw sensor data or perception data. In response to receiving the driving limitations and the request defining the type of data required, the towing controller 62 transmits either raw sensor data or perception data to the automated driving controller 20 of the autonomous vehicle 10 over the communication link 84, and the driving module 100 of the automated driving controller 20 executes planning and control algorithms based on either the raw sensor data or the perception data.

Some examples of raw sensor data include, but are not limited to, image data from the camera 72, signals from the radar 74, data from the IMU 76, GPS coordinates, or signals from the LiDAR 80. Referring specifically to FIG. 3, if the towing controller 62 transmits raw sensor data to the automated driving controller 20 of the autonomous vehicle 10, then the receding horizon monitoring module 96 may be omitted from the automated driving controller 20. Instead, the verification module 98 compares the raw sensor data received from the towing controller 62 of the towing taxi 12 with data collected from the plurality of on-board autonomous sensors 22 that are still functional. In the event the raw sensor data collected from the towing taxi 12 matches the data collected from the plurality of on-board autonomous sensors 22, then the verification module 98 of the automated driving controller 20 determines the raw sensor data is valid.

In response to determining the raw sensor data received from the towing taxi 12 is valid, the driving module 100 of the automated driving controller 20 determines one or more driving maneuvers based on the raw sensor data received from the towing taxi 12.

Alternatively, in another embodiment, the request sent to the towing controller 62 of the towing taxi 12 from the automated driving controller 20 of the autonomous vehicle 10 indicates perception data is required. In response to receiving the request from the automated driving controller 20, the towing controller 62 sends perception data over the communication link 84 to the automated driving controller 20. The perception data indicates data about the surrounding environment such as, for example, obstacles, lane markings, and their predictions.

Referring to both FIGS. 3 and 4, if the perception data is transmitted over the communication link 84, then the receding horizon monitoring module 96 receives as input the current data string 110, which includes a perception data point corresponding to the current point in time in combination with a perception data point for each of the one or more predicted points of time in the future. The receding horizon monitoring module 96 compares the current data string 110 with the previous data string 114, which was recorded at a previous point in time $t_{0-1}$ that occurred immediately before the current point in time to. In response to determining the current data string 110 matches the previous data string 114, the receding horizon monitoring module 96 determines the current data string 110 is valid. In response to verifying the current data string 110 is valid, the verification module 98 selects a specific data point of the current data string 110 to use based on a time stamp. The driving module 100 of the automated driving controller 20 then determines one or more driving maneuvers based on the perception data point of the current data string 110 indicated by the time stamp.

Figure 5:
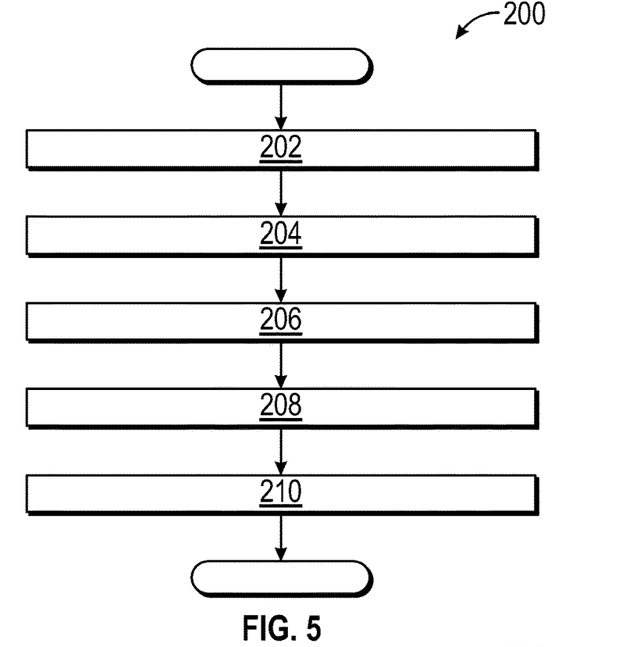
FIG. 5 is a process flow diagram illustrating a method for guiding the autonomous vehicle based on a centralized approach, according to an exemplary embodiment.

FIG. 5 is a process flow diagram illustrating a method 200 for guiding the autonomous vehicle 10 based on the centralized approach. Referring generally to FIGS. 1-5, the method 200 begins at block 202. In block 202, the vehicle-health monitoring module 90 of the automated driving controller 20 (FIG. 3) determines the autonomous driving system 14 is non-functional. The method 200 may then proceed to block 204.

In block 204, in response to determining the autonomous driving system 14 is non-functional, the notification module 92 of the automated driving controller 20 generates the notification indicating the autonomous driving system 14 is non-functional. As mentioned above, the notification results in the towing taxi 12 being dispatched to a geographical location of the autonomous vehicle 10. The method 200 may then proceed to block 206.

In block 206, the automated driving controller 20 receives, from the towing taxi 12, the current data string 110 (FIG. 4) including the data point corresponding to the current point in time in combination with the predicted data point for each of one or more predicted points of time in the future. The method 200 may then proceed to block 208.

In block 208, receding horizon monitoring module 96 of the automated driving controller 20 (seen in FIG. 3) compares the current data string 110 with a previous data string 114 recorded at a previous point in time $t_{0-1}$ that occurred immediately before the current point in time $t_0$ (FIG. 4). The method 200 may then proceed to block 210.

In block 210, in response to determining the current data string 110 matches the previous data string 114 (seen in FIG. 4), the driving module 100 of the automated driving controller 20 (seen in FIG. 3) determines one or more driving maneuvers for the autonomous vehicle based on the current data string 110. The method 200 may then terminate.

Figure 6:
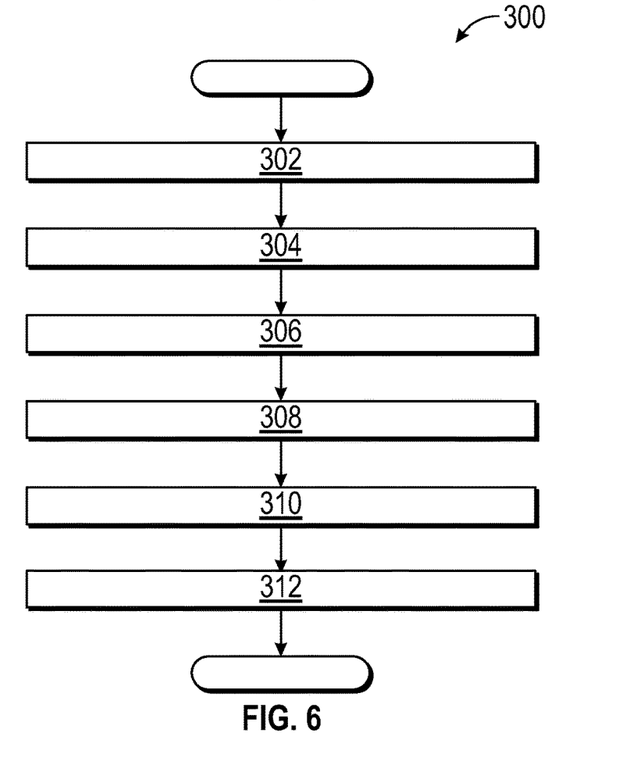
FIG. 6 is a process flow diagram illustrating a method for guiding the autonomous vehicle based on a projection approach, according to an exemplary embodiment.

FIG. 6 is a process flow diagram illustrating a method 300 for guiding the autonomous vehicle 10 based on the centralized approach. Referring generally to FIGS. 1-3 and 6, the method 300 begins at block 302. In block 302, the vehicle-health monitoring module 90 of the automated driving controller 20 determines the autonomous driving system 14 is non-functional. The method 300 may then proceed to block 304.

In block 304, in response to determining the autonomous driving system is non-functional, the notification module 92 generates the notification indicating the autonomous driving system 14 is non-functional, where the notification results in the towing taxi 12 being dispatched to the geographical location where the autonomous vehicle 10 is located. The method 300 may then proceed to block 306.

In block 306, the automated driving controller 20 sends the request for raw sensor data to the towing taxi 12. The method 300 may then proceed to block 308.

In block 308, the verification module 98 of the automated driving controller 20 compares the raw sensor data received from the towing taxi 12 with data collected from the plurality of on-board autonomous sensors 22 that are still functional. The method 300 may then proceed to block 310.

In block 310, the verification module 98 of the automated driving controller 20 determines the raw sensor data received from the towing taxi 12 matches the data collected from the plurality of on-board autonomous sensors 22 that are still functional. The method 300 may then proceed to block 312.

In block 312, in response to determining the raw sensor data received from the towing taxi 12 matches the data collected from the plurality of on-board autonomous sensors 22 that are still functional match, the driving module 100 of the automated driving controller 20 determine one or more driving maneuvers based on the raw sensor data received from the towing taxi 12. The method 300 may then terminate.

Figure 7:
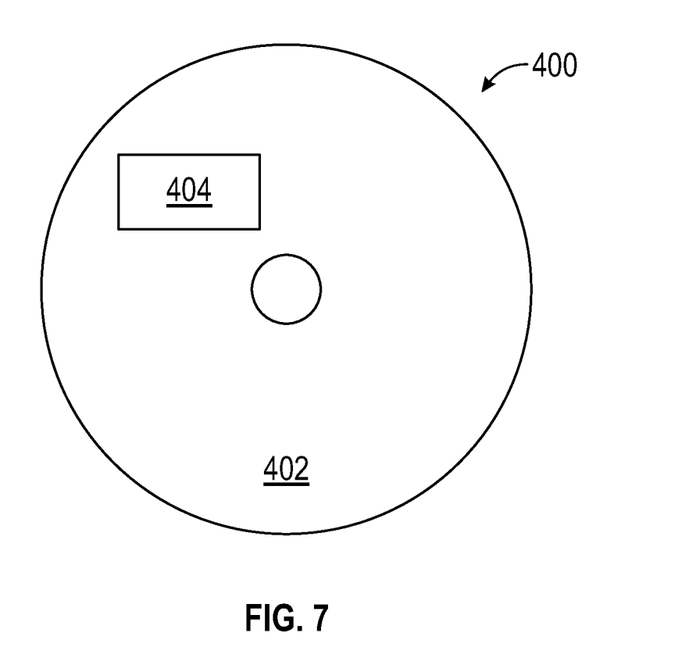
FIG. 7 illustrates a computer program product including one or more storage media, according to an exemplary embodiment.

Referring now to FIG. 7, a computer program product 400 includes one or more non-transitory computer readable storage mediums 402. The storage medium 402 stores computer readable program code or logic 404 thereon to provide and facilitate one or more aspects of embodiments described herein. The program code or logic is created using a compiler or assembler for example, to assemble instructions, that, when executed perform aspects of embodiments. The program code, when created and stored on a tangible medium, is referred to as a computer readable medium. Some examples of a computer readable medium include, but are not limited to, electronic memory modules (RAM), flash memory, and compact discs (CDs). The computer program product medium is readable by a processing circuit in a computer system for execution by a processing circuit.

Referring generally to the figures, the autonomous vehicle and towing taxi provides various technical effects and benefits. Specifically, the towing taxi guides the autonomous vehicle to a predetermined destination in the event the autonomous driving system is no longer functional. The towing taxi may be especially advantageous in situations where the autonomous vehicle is completely autonomous and includes no driver inputs such as, for example, a steering wheel, since the user would be unable to steer the autonomous vehicle. Furthermore, the disclosed towing taxi may be especially advantageous in challenging scenarios such as road closures when the towing taxi is an air-based vehicle and has an aerial view.

The controllers may refer to, or be part of an electronic circuit, a combinational logic circuit, a field programmable gate array (FPGA), a processor (shared, dedicated, or group) that executes code, or a combination of some or all of the above, such as in a system-on-chip. Additionally, the controllers may be microprocessor-based such as a computer having a at least one processor, memory (RAM and/or ROM), and associated input and output buses. The processor may operate under the control of an operating system that resides in memory. The operating system may manage computer resources so that computer program code embodied as one or more computer software applications, such as an application residing in memory, may have instructions executed by the processor. In an alternative embodiment, the processor may execute the application directly, in which case the operating system may be omitted.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. An autonomous driving system for an autonomous vehicle, the autonomous driving system comprising:
   an automated driving controller wirelessly connected to a towing taxi that guides the autonomous vehicle when the autonomous driving system is non-functional, wherein the automated driving controller is instructed to:
   determine the autonomous driving system is non-functional;
   in response to determining the autonomous driving system is non-functional, generate a notification indicating the autonomous driving system is non-functional, wherein the notification results in the towing taxi being dispatched to a geographical location of the autonomous vehicle;
   receive, from the towing taxi, a current data string including a data point corresponding to a current point in time in combination with a predicted data point for each of one or more predicted points of time in the future;
   compare the current data string with a previous data string recorded at a previous point in time that occurred immediately before the current point in time; and
   in response to determining the current data string matches the previous data string, determine one or more driving maneuvers for the autonomous vehicle based on the current data string.

2. The autonomous driving system of claim 1, wherein the data point corresponding to the current point in time and the predicted data point for each of one or more predicted points of time in the future is represented by a final command determined by the towing taxi.

3. The autonomous driving system of claim 2, wherein the final command represents driver input positions of the autonomous vehicle.

4. The autonomous driving system of claim 3, wherein the driver input positions include an accelerator pedal position, a brake pedal position, and a steering wheel angle position.

5. The autonomous driving system of claim 2, wherein the final command represents a reference trajectory set point for the autonomous vehicle.

6. The autonomous driving system of claim 5, wherein the reference trajectory set point includes a speed trajectory point or a heading angle trajectory point for the autonomous vehicle.

7. The autonomous driving system of claim 2, wherein the final command represents a target goal for the autonomous vehicle.

8. The autonomous driving system of claim 1, wherein the data point corresponding to the current point in time and the predicted data point for each of one or more predicted points of time in the future is represented by perception data determined by the towing taxi.

9. The autonomous driving system of claim 8, wherein the automated driving controller executes instructions to:
   transmit, to the towing taxi, driving limitations and a request defining a type of data required, wherein the towing taxi transmits the perception data in response to receiving the driving limitations and the request defining the type of data.

10. The autonomous driving system of claim 1, wherein the automated driving controller is in wireless communication with a back office system including a back office facility.

11. The autonomous driving system of claim 10, wherein the notification indicating the autonomous driving system is non-functional is transmitted to the back office facility of the back office system.

12. The autonomous driving system of claim 11, wherein the autonomous vehicle includes a plurality of on-board autonomous sensors in electronic communication with the automated driving controller.

13. The autonomous driving system of claim 12, wherein at least one of the automated driving controller and the plurality of on-board autonomous sensors experience a fault that causes the autonomous driving system to become non-functional.

14. The autonomous driving system of claim 12, wherein the plurality of on-board autonomous sensors include at least one of the following: one or more cameras, one or more radars, an inertial measurement unit (IMU), a global positioning system (GPS), and one or more LiDARs.

15. The autonomous driving system of claim 1, wherein the automated driving controller executes instructions to:
   repeatedly receives a predicted receding horizon set of data from the towing taxi, wherein the predicted receding horizon set of data includes at least one of the following: predictions of future commands and perception data.

16. The autonomous driving system of claim 1, wherein the automated driving controller executes instructions to:
   determine a data drop between the automated driving controller and the towing taxi has occurred; and
   in response determines one or more driving maneuvers based on the data included in the previous data string.

17. The autonomous driving system of claim 16, wherein the data drop occurs when a specific data string for the current point in time is missed and is not transmitted to the automated driving controller from the towing taxi.

18. An autonomous driving system for an autonomous vehicle, the autonomous driving system comprising:
   a plurality of on-board autonomous sensors that sense data related to operation of the autonomous vehicle and a surrounding environment; and
   an automated driving controller in electronic communication with the plurality of on-board autonomous sensors and wirelessly connected to a towing taxi that guides the autonomous vehicle when the autonomous driving system is non-functional, wherein the automated driving controller is instructed to:

determine the autonomous driving system is non-functional;

in response to determining the autonomous driving system is non-functional, generate a notification indicating the autonomous driving system is non-functional, wherein the notification results in the towing taxi being dispatched to a geographical location where the autonomous vehicle is located;

send a request for raw sensor data to the towing taxi;

compare the raw sensor data received from the towing taxi with data collected from the plurality of on-board autonomous sensors that are still functional;

determine the raw sensor data received from the towing taxi matches the data collected from the plurality of on-board autonomous sensors that are still functional; and in response to determining the raw sensor data received from the towing taxi matches the data collected from the plurality of on-board autonomous sensors that are still functional match, determine one or more driving maneuvers based on the raw sensor data received from the towing taxi.

19. The autonomous driving system of claim 18, wherein the raw sensor data received from the towing taxi includes one or more of the following: image data, signals from a radar, data from an IMU, GPS coordinates, and signals from a LiDAR.

20. A non-transitory computer readable storage medium readable by a processing circuit and storing instructions that when executed by the processing circuit perform method operations, comprising:

determining an autonomous driving system is non-functional, wherein the autonomous driving system is for an autonomous vehicle;

in response to determining the autonomous driving system is non-functional, generating a notification indicating the autonomous driving system is non-functional, wherein the notification results in a towing taxi being dispatched to a geographical location of the autonomous vehicle;

receiving, from the towing taxi, a current data string including a data point corresponding to a current point in time in combination with a predicted data point for each of one or more predicted points of time in the future;

comparing the current data string with a previous data string recorded at a previous point in time that occurred immediately before the current point in time; and in response to determining the current data string matches the previous data string, determining one or more driving maneuvers for the autonomous vehicle based on the current data string.

* * * * *